J. D. CRAFT.
MOTOR TRUCK.
APPLICATION FILED DEC. 26, 1917.

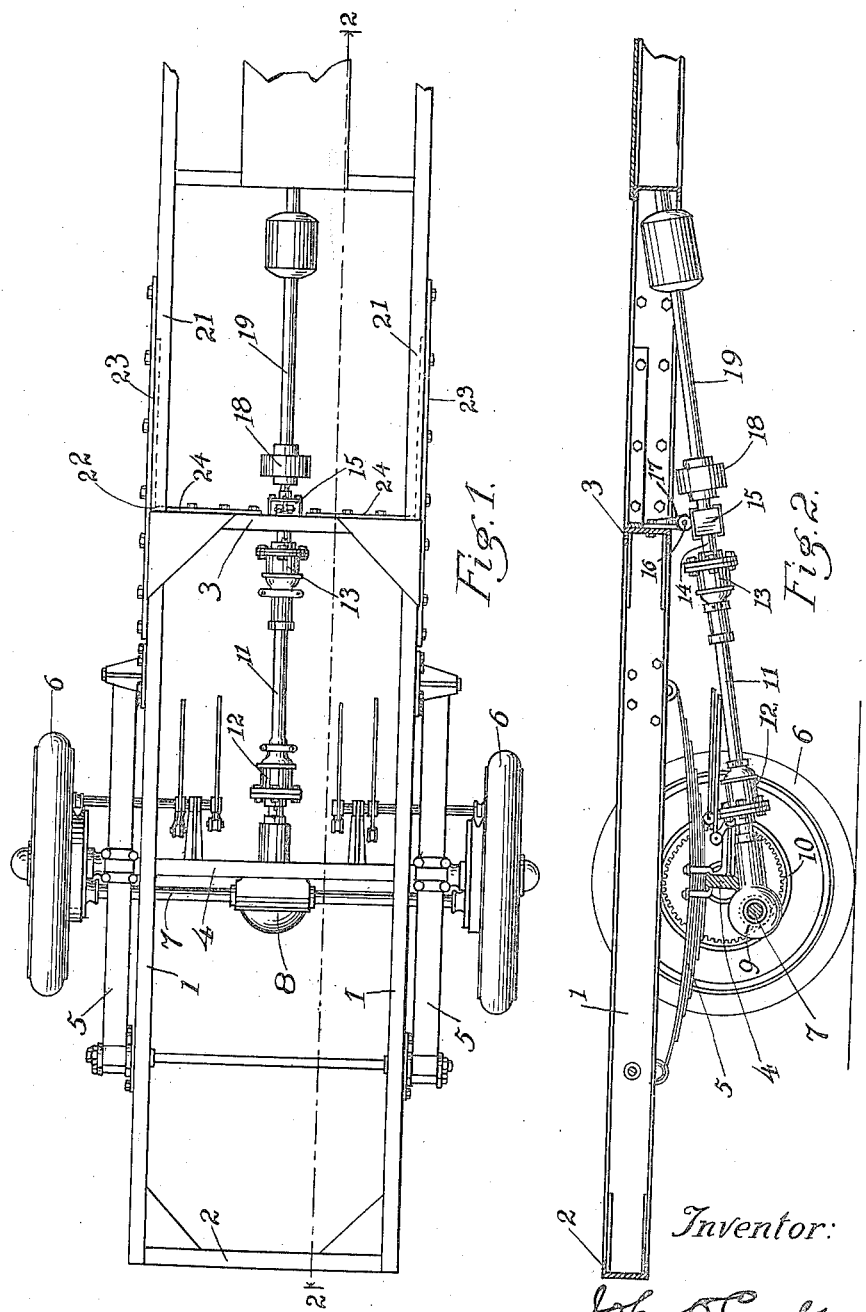

1,261,105.

Patented Apr. 2, 1918.
2 SHEETS—SHEET 2.

Inventor:
John D. Craft
By Allen & Allen
Attorneys.

UNITED STATES PATENT OFFICE.

JOHN D. CRAFT, OF EVANSVILLE, INDIANA.

MOTOR-TRUCK.

1,261,105. Specification of Letters Patent. Patented Apr. 2, 1918.

Application filed December 26, 1917. Serial No. 208,765.

*To all whom it may concern:*

Be it known that I, JOHN D. CRAFT, a citizen of the United States, and a resident of Evansville, in the county of Vanderburg and State of Indiana, have invented certain new and useful Improvements in Motor-Trucks, of which the following is a full, clear, and exact description, reference being had to the accompanying drawings, forming part of this specification.

The object of my invention is to provide a universal truck unit which may be attached to the chassis of any automobile construction to convert the car into a commercial truck, whereby old or new automobiles of whatever make may be readily converted into a truck by removing the rear portion of the chassis and attaching my unit construction.

The special features of my invention embody a complete rear frame and rear axle construction with drive shaft, differential, drive mechanism for the rear truck wheels, universal joints, bearings for the drive shaft, all complete with the truck construction ready for attachment to the drive shaft of the automobile.

One special feature of improvement consists in the novel method of attaching the drive shaft of the truck unit to the drive shaft of the automobile, and another special feature consists in the method of uniting the two frames rigidly and securely to compensate for the variations in width of the respective frames, all of which together with other novel features will be hereinafter particularly pointed out and claimed.

In the drawings which illustrate one of the preferable constructions embodying my invention, Figure 1 is a plan view of my improved construction.

Fig. 2 is a side elevation of the same.

Figure 3:
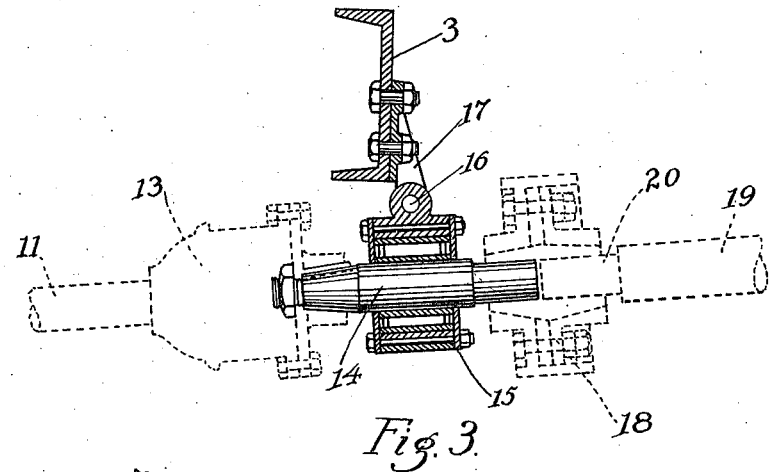
Fig. 3 is a sectional plan view of the drive shaft connections.

The framework of the truck unit is preferably a rectangular metal frame of side bars 1, 1, and end and front bars 2, 3, securely fastened together, and the frame is preferably supported on the rear axle 4 by semi-elliptical springs 5, 5, properly swung at the sides of the frame and securely bolted to the axle. The carrying wheels 6, 6, of the truck are in the construction illustrated driven through the differential axle 7, with differential 8 through a pinion and gear drive, with pinions 9, 9, on the ends of the axles engaging the internal gears 10, 10, secured to the wheels 6, 6, although, of course, any other well known type of drive, worm, chain or gear drive may be employed. The driving shaft 11 of the truck unit is coupled by a universal joint 12 of the usual construction, with the differential mechanism in the rear and with a second universal joint 13 with the forward extension 14 of the drive shaft, and this extension shaft 14 is supported centrally on the front bar 3 of the truck frame in a bearing box 15 provided with rollers, balls or other type of bearing.

The bearing box 15 is pivotally supported by a pivot pin 16 on the bracket plate 17 securely bolted to the front frame 3 so as to be adjustable so that the shaft can be raised or lowered to fit any make of automobile chassis. The forward end of the stub shaft 14 carries the coupling block 18 and the rear end of the chassis drive shaft 19 is cut off at the proper point, and if need be, turned down at 20 to fit the coupling block 18 to securely couple the two shafts together. Instead of using the coupling, the ends of the two shafts can of course be welded together if desired.

To secure the truck unit to any make of chassis, the rear portion of the chassis frame 21 is cut away at 22 and the two frames are bolted together by a set of side attaching plates or bars 23, 23, on the outside of the rearwardly projected side members of the chassis frame, and a set of angle plates or bars 24, 24, on the inside, holes being drilled at suitable points in the chassis frame and the inside and outside plates being clamped on each side to their respective side members by the same bolts.

Figure 4:
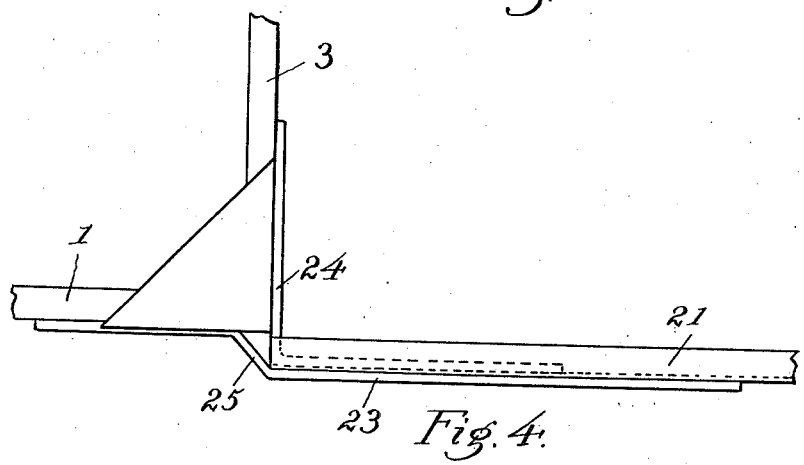
Fig. 4 is a plan view of one corner of the truck frame showing the attachment when the chassis frame is wider than the truck frame.
Figure 5:
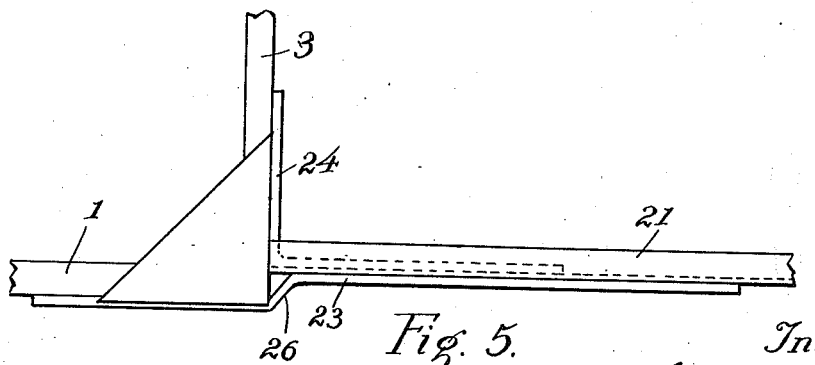
Fig. 5 is a similar view when the chassis frame is narrower than that of the truck.

In the event that the chassis frame is wider than the truck frame, the outside members are bent outwardly, as shown at 25 in Fig. 4, and the angle plates are slipped outwardly while if the chassis is narrower, the outside members are bent inwardly as shown at 26 in Fig. 5, and the angle plates correspondingly shifted inwardly.

With the construction of truck connections as above described, the truck unit can be put together and sold as a construction complete in itself and adapted to be readily and easily secured to any automobile chassis, especially for old cars which have passed their usefulness as pleasure cars and which can thus be converted into a truck construction at a very minimum expense. The only portion of the unit construction which will not fit any car is the outside attaching member, and when the width of the chassis to be converted is given, the manufacturer can furnish the properly bent outside attaching bars, or straight bars can be readily bent by the user. The coupling block is also designed for one diameter of shaft so that the rear end of the chassis drive shaft must be turned down to fit, another matter of very minimum expense.

Having thus described my invention, what I claim as new and desire to secure by Letters Patent, is:—

1. In a truck construction, a rear frame drive shaft, differential and drive mechanism for the truck wheels, a forwardly projecting stub shaft, with universal joint intermediate said shaft and the truck driving shaft, and a swinging bearing for the stub shaft on the truck frame, whereby the truck driving shaft may be readily coupled to any automobile drive shaft.

2. In a truck construction, a rear frame comprising side, rear and front bars, drive shaft, differential and drive mechanism for the truck wheels, a forwardly projecting stub shaft, with universal joint intermediate said shaft and the truck driving shaft, and a bearing box for the stub shaft, with pivotal mounting therefor to the front bar of the frame, whereby the truck driving shaft may be readily coupled to any automobile drive shaft.

3. In a truck construction, a rear frame, drive shaft, differential and drive mechanism for the truck wheels, a forwardly projecting stub shaft, with universal joint intermediate said shaft and the truck driving shaft, and a swinging bearing for the stub shaft on the truck frame, a chassis frame, with bars securing together on the outside the respective side bars of the two frames, and angle bars secured to the truck frame and engaging the side members of the chassis frame on the inside.

4. In a truck construction, a rear frame, drive shaft, differential and drive mechanism for the truck wheels, a forwardly projecting stub shaft, with universal joint intermediate said shaft and the truck driving shaft, and a swinging bearing for the stub shaft on the truck frame, a chassis frame, with bars securing together on the outside the respective side bars of the two frames, laterally adjustable angle bars secured to the front cross member of the truck frame and engaging the side members of the chassis frame on the inside.

5. In a truck construction, a rear frame, drive shaft, differential and drive mechanism for the truck wheels, a forwardly projecting stub shaft, with universal joint intermediate said shaft and the truck driving shaft, and a swinging bearing for the stub shaft on the truck frame, a chassis frame, with bars securing together on the outside the respective side bars of the two frames, laterally adjustable angle bars secured to the front cross member of the truck frame and engaging the side members of the chassis frame on the inside, the outside retaining bars adapted to be bent to conform to the width of the chassis frame.

6. In a truck construction, a rear frame provided with a front cross bar, and a chassis frame with rearwardly projecting side bars, means for securing the two frames together comprising outside side bars adapted to be bent medially to conform to varying sizes of the two frames, and inside angle bars secured to the front cross bar of the truck frame and adapted to be shifted laterally.

7. In a truck construction, a rear frame, drive shaft, differential and drive mechanism for the truck wheels, a forwardly projecting stub shaft, with universal joints intermediate said shaft and the truck driving shaft forwardly and the driving shaft and the differential mechanism rearwardly, and a swinging bearing for the stub shaft on the truck frame, whereby the truck driving shaft may be readily coupled to any automobile drive shaft.

JOHN D. CRAFT.